United States Patent
Li et al.

(10) Patent No.: US 11,782,793 B2
(45) Date of Patent: Oct. 10, 2023

(54) BLOCKCHAIN-BASED DATA SNAPSHOT METHOD AND APPARATUS, AND COMPUTER-READABLE STORAGE MEDIUM

(71) Applicant: TENCENT TECHNOLOGY (SHENZHEN) COMPANY LIMITED, Shenzhen (CN)

(72) Inventors: Maocai Li, Shenzhen (CN); Changqing Yang, Shenzhen (CN); Kaiban Zhou, Shenzhen (CN); Qucheng Liu, Shenzhen (CN); Gengliang Zhu, Shenzhen (CN); Jinsong Zhang, Shenzhen (CN); Huankun Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/740,925

(22) Filed: May 10, 2022

(65) Prior Publication Data
US 2022/0269568 A1   Aug. 25, 2022

Related U.S. Application Data

(63) Continuation of application No. PCT/CN2021/078005, filed on Feb. 26, 2021.

(30) Foreign Application Priority Data

Apr. 22, 2020 (CN) .......................... 202010321605.6

(51) Int. Cl.
*G06F 16/20* (2019.01)
*G06F 11/14* (2006.01)
(Continued)

(52) U.S. Cl.
CPC .......... *G06F 11/1446* (2013.01); *G06F 16/27* (2019.01); *G06F 2201/84* (2013.01); *G06Q 20/389* (2013.01)

(58) Field of Classification Search
None
See application file for complete search history.

(56) References Cited

U.S. PATENT DOCUMENTS 11,188,418 B2    11/2021  Zhuo
2018/0039667 A1* 2/2018   Pierce ................. G06F 16/2365
(Continued)

FOREIGN PATENT DOCUMENTS

CN    108241743 A    7/2018
CN    108805570 A    11/2018
(Continued)

OTHER PUBLICATIONS

The State Intellectual Property Office of the People's Republic of China (SIPO) Office Action 1 for for 202010321605.6 dated Jun. 7, 2021 7 Pages (including translation).
(Continued)

*Primary Examiner* — Jau Shya Meng
(74) *Attorney, Agent, or Firm* — ANOVA LAW GROUP PLLC

(57) ABSTRACT

A blockchain-based data snapshot method, performed by a consensus node in a blockchain network, includes: obtaining a snapshot trigger instruction and a trigger moment of the snapshot trigger instruction; performing snapshot processing on one or more transaction blocks in a ledger at the trigger moment, to obtain a snapshot account state of a transaction account, the snapshot account state being account data related to transaction data in the transaction blocks; obtaining a write-ahead logging (WAL) log of a target block, the target block being a block with a highest block height in the
(Continued)

transaction blocks, the WAL log including a log of account data corresponding to the target block; and correcting dirty data in the snapshot account state according to the WAL log, to obtain a corrected snapshot account state, the dirty data being generated based on incomplete transaction data in the target block included in the ledger.

20 Claims, 8 Drawing Sheets

(51) Int. Cl.
*G06F 16/27* (2019.01)
*G06Q 20/38* (2012.01)

(56) References Cited

U.S. PATENT DOCUMENTS

2018/0232807 A1    8/2018  Crabtree et al.
2020/0167345 A1*   5/2020  Zhuo ................... G06F 16/2246

FOREIGN PATENT DOCUMENTS

| CN | 109636388 A | 4/2019 |
| CN | 109933460 A | 6/2019 |
| CN | 110400142 A | 11/2019 |
| CN | 110807064 A | 2/2020 |
| CN | 110910249 A | 3/2020 |
| CN | 111033491 A | 4/2020 |
| CN | 111507720 A | 8/2020 |
| WO | 2019228569 A2 | 12/2019 |

OTHER PUBLICATIONS

The World Intellectual Property Organization (WIPO) International Search Report for PCT/CN2021/078005 dated May 7, 2021 7 Pages (including translation).

* cited by examiner

BLOCKCHAIN-BASED DATA SNAPSHOT METHOD AND APPARATUS, AND COMPUTER-READABLE STORAGE MEDIUM

CROSS-REFERENCES TO RELATED APPLICATIONS

This application is a continuation application of PCT Patent Application No. PCT/CN2021/078005, entitled "BLOCKCHAIN-BASED DATA SNAPSHOT METHOD AND DEVICE, AND COMPUTER READABLE STORAGE MEDIUM" and filed on Feb. 26, 2021, which claims priority to Chinese Patent Application No. 202010321605.6, entitled "BLOCKCHAIN-BASED DATA SNAPSHOT METHOD AND APPARATUS, AND COMPUTER-READABLE STORAGE MEDIUM" filed on Apr. 22, 2020, the entire contents of both of which are incorporated herein by reference.

FIELD OF THE TECHNOLOGY

The present disclosure relates to the field of data processing technologies, and in particular, to a blockchain-based data snapshot technology.

BACKGROUND OF THE DISCLOSURE

At a moment A, snapshot processing is performed on a transaction account. That is, at the moment A, an account state of the transaction account is backed up. The account state of the transaction account may refer to a state of account balance of the transaction account.

There may be a consensus node in a blockchain network, and the account state of the transaction account is account data obtained after the transaction account is executed using transaction data in each block submitted to a ledger of the consensus node. At a snapshot trigger moment (assuming to be a moment B), it is very likely that the consensus node is submitting a block to the ledger, and the block being submitted is not fully submitted to the ledger at the moment B. Therefore, in the related art, after the snapshot is triggered, snapshot processing cannot be performed on the account state of the transaction account until the consensus node finishes submitting the block to the ledger, which will result in a relatively large delay in snapshot processing for the transaction account.

SUMMARY

The present disclosure provides a blockchain-based data snapshot method and apparatus, and a computer-readable storage medium, which can ensure real-time performance of snapshot processing for a transaction account.

According to an aspect, the present disclosure provides a blockchain-based data snapshot method, including: obtaining a snapshot trigger instruction and a trigger moment of the snapshot trigger instruction; performing snapshot processing on one or more transaction blocks in a ledger at the trigger moment according to the snapshot trigger instruction, to obtain a snapshot account state of a transaction account, the snapshot account state being account data related to transaction data in the one or more transaction blocks; obtaining a write-ahead logging (WAL) log of a target block, the target block being a block with a highest block height in the one or more transaction blocks, the WAL log of the target block including account data corresponding to the target block; and correcting dirty data in the snapshot account state according to the WAL log of the target block, to obtain a corrected snapshot account state, the dirty data being generated based on incomplete transaction data in the target block included in the ledger.

According to an aspect, the present disclosure provides a blockchain-based data snapshot apparatus, including: an instruction obtaining module, configured to obtain a snapshot trigger instruction and a trigger moment of the snapshot trigger instruction; a snapshot module, configured to perform snapshot processing on one or more transaction blocks in a ledger at the trigger moment according to the snapshot trigger instruction, to obtain a snapshot account state of a transaction account, the snapshot account state being account data related to transaction data in the one or more transaction blocks; a log obtaining module, configured to obtain a WAL log of a target block, the target block being a block with a highest block height in the one or more transaction blocks, the WAL log of the target block including account data corresponding to the target block; and a correction module, configured to correct dirty data in the snapshot account state according to the WAL log of the target block, to obtain a corrected snapshot account state, the dirty data being generated based on incomplete transaction data in the target block included in the ledger.

According to an aspect, the present disclosure provides a computer device, including a memory and a processor, the memory storing a computer program, the computer program, when executed by the processor, causing the processor to perform: obtaining a snapshot trigger instruction and a trigger moment of the snapshot trigger instruction; performing snapshot processing on one or more transaction blocks in a ledger at the trigger moment according to the snapshot trigger instruction, to obtain a snapshot account state of a transaction account, the snapshot account state being account data related to transaction data in the one or more transaction blocks; obtaining a write-ahead logging (WAL) log of a target block, the target block being a block with a highest block height in the one or more transaction blocks, the WAL log of the target block including account data corresponding to the target block; and correcting dirty data in the snapshot account state according to the WAL log of the target block, to obtain a corrected snapshot account state, the dirty data being generated based on incomplete transaction data in the target block included in the ledger.

According to an aspect, the present disclosure provides a non-transitory computer-readable storage medium, storing a computer program including a program instruction, the program instruction, when executed by a processor, causing the processor to perform the method according to the foregoing aspect.

According to an aspect, the present disclosure provides a computer program product, the computer program product, when executed, being configured to perform the method according to the foregoing aspect.

In the present disclosure, during data snapshot, a snapshot trigger instruction and a trigger moment of the snapshot trigger instruction can be obtained. According to the snapshot trigger instruction, snapshot processing is performed on one or more transaction blocks in a ledger at the trigger moment, to obtain a snapshot account state of a transaction account, the snapshot account state being account data related to transaction data in the one or more transaction blocks. During addition of transaction blocks into a master database, a next transaction block is added only after addition of a previous transaction block is completed, and a block height of the next block is greater than a block height of the previous block. Therefore, only a block with a highest block height in the master database is incomplete. Therefore, to avoid that a target block with a highest block height in the one or more transaction blocks is not fully submitted to the ledger at the snapshot trigger moment, the WAL log of the target block can be obtained. The WAL log of the target block is a log including account data corresponding to the target block, so that dirty data in the snapshot account state can be corrected according to the WAL log of the target block, to obtain a corrected snapshot account state, the dirty data being generated based on incomplete transaction data in the target block included in the ledger. It can be seen that, according to the method provided in the present disclosure, the dirty data generated by the incomplete target block in the snapshot can be corrected through the WAL log of the target block. Therefore, even if the target block is not fully added to the ledger at the trigger moment, snapshot processing can also be immediately performed on the account state of the transaction account, which improves the efficiency of obtaining the snapshot account state of the transaction account.

BRIEF DESCRIPTION OF THE DRAWINGS

To describe the technical solutions in the present disclosure or in the related art more clearly, the following briefly describes the accompanying drawings required for describing the embodiments or the related art. Apparently, the accompanying drawings in the following description show merely some embodiments of the present disclosure. A person of ordinary skill in the art may still derive other drawings from these accompanying drawings without creative efforts.

DESCRIPTION OF EMBODIMENTS

The technical solutions of the present disclosure are clearly and completely described below with reference to the accompanying drawings of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The present disclosure relates to the related art of a blockchain. The blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer. The blockchain includes a series of blocks that are consecutive in a chronological order of generation. Once a new block is added to the blockchain, the new block is no longer removed. The block records recorded data submitted by the node in the blockchain system.

Figure 1:
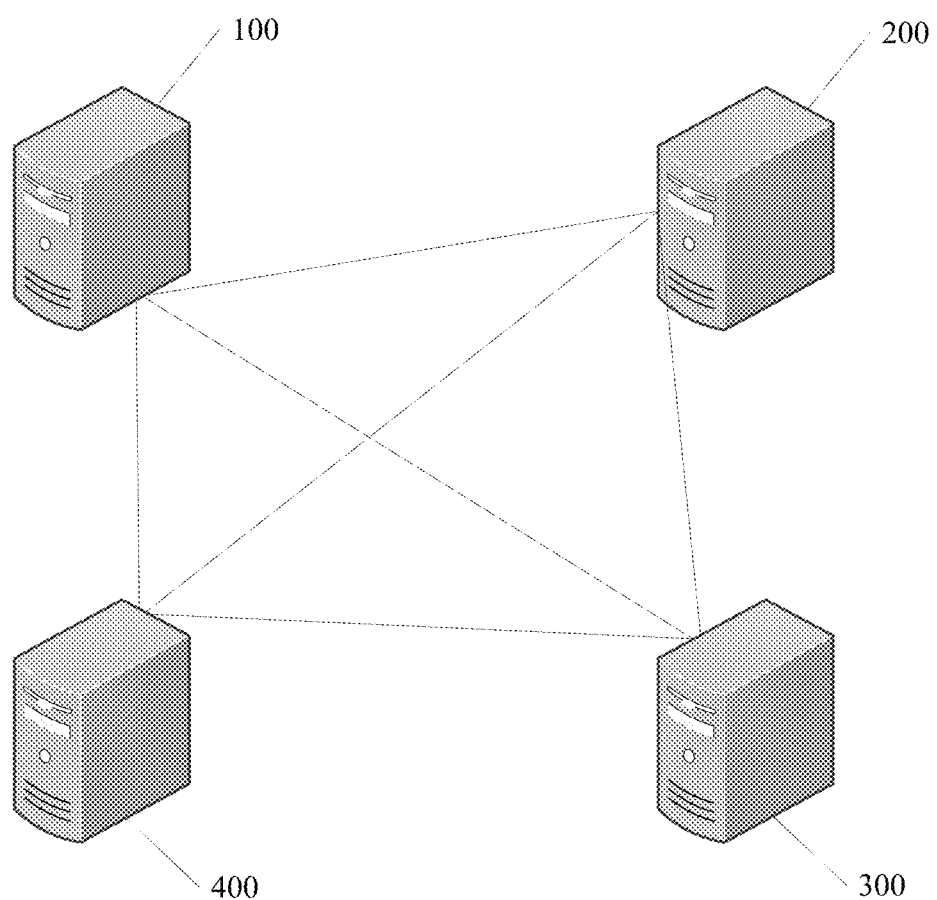
FIG. 1 is a schematic architectural diagram of a system according to an embodiment of the present disclosure.

FIG. 1 is a schematic architectural diagram of a system according to an embodiment of the present disclosure. The schematic architectural diagram of the system includes a plurality of nodes. The plurality of nodes are all nodes in a blockchain network, and specifically include a node 100, a node 200, a node 300, and a node 400. A node may be formed by a server, or may be formed by a plurality of servers, and a number of servers forming a node is determined according to an actual application scenario, which is not limited herein. The node 100, the node 200, the node 300 and the node 400 are connected to each other, and the node 100, the node 200, the node 300 and the node 400 may include one or more consensus nodes. Each consensus node can perform snapshot processing on an account state of a transaction account (that is, perform backup processing on the account state of the transaction account), and the account state of the transaction account is account data obtained after a transaction to which transaction data in blocks submitted to a ledger of the consensus node belongs is executed on the transaction account. It is to be understood that blocks submitted to the ledger of each consensus node belonging to the same blockchain network are the same. A process of performing snapshot processing on the transaction account by each consensus node is the same and independent. Here, the present disclosure is described by using an example in which snapshot processing is performed on the account state of the transaction account by the consensus node 100 as an example.

Figure 2:
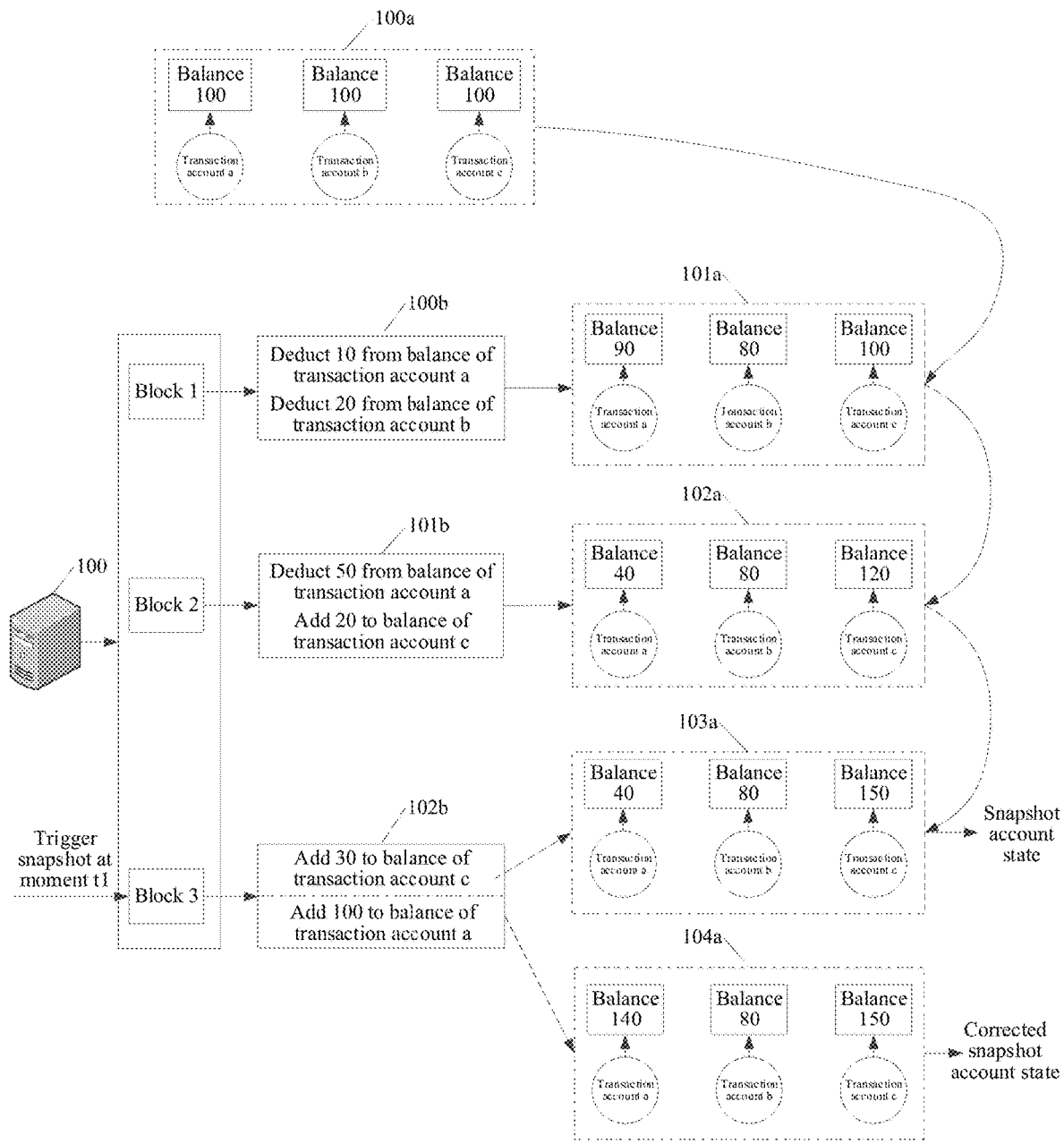
FIG. 2 is a schematic diagram of a snapshot processing scenario according to an embodiment of the present disclosure.

FIG. 2 is a schematic diagram of a snapshot processing scenario according to an embodiment of the present disclosure. As shown in FIG. 2, a block 1, a block 2 and a block 3 are submitted to a ledger of the consensus node 100, and each block may include a plurality of pieces of transaction data. At a moment t1, submission of the block 1 and the block 2 to the ledger of the consensus node 100 is finished. The block 3 is being submitted to the ledger of the consensus node 100. That is, only part of transaction data is submitted. The account state of the transaction account (which can refer to an account balance of the transaction account) is account data of the transaction account generated after a transaction, to which transaction data in blocks submitted to the ledger of the consensus node 100 belongs, is executed. When the consensus node submits blocks, a next block will not be submitted only after submission of a current block into the ledger is finished. Therefore, it is assumed that before the consensus node 100 submits the block 1 to the ledger, the account state of the transaction account (including a transaction account a, a transaction account b, and a transaction account c) is an account state 100a. The account state 100a is specifically that: balance of the transaction account a is 100, balance of the transaction account b is 100, and balance of the transaction account c is 100. Here, when an operation performed on the transaction account is an operation 100b (that is, deducting 10 from the balance of the transaction account a, and deducting 20 from the balance of the transaction account b) after a transaction to which transaction data in the block 1 belongs is executed, the account state 100a can become an account state 101a by submitting the block 1 to the ledger. The account state 101a is specifically that: the balance of the transaction account a is 90 (100 minus 10), the balance of the transaction account b is 80 (100 minus 20), and the balance of the transaction account c is 100. When an operation performed using the transaction data in the block 2 on the transaction account is an operation 101b (that is, deducting 50 from the balance of the transaction account a, and adding 20 to the balance of the transaction account c), the account state 101a may become an account state 102a by submitting the block 2 to the ledger. The account state 102a is specifically that: the balance of the transaction account a is 40 (90 minus 50), the balance of the transaction account b is 80, and the balance of the transaction account c is 120 (100 plus 20). When an operation performed on the transaction account is an operation 102b (that is, adding 30 to the balance of the transaction account c, and adding 100 to the balance of the transaction account a) after a transaction to which the transaction data in the block 3 belongs is executed, an operation performed on the transaction account is "adding 30 to the balance of the transaction account c" in the operation 102b after a transaction to which part of the transaction data in the block 3 submitted to the ledger belongs is executed before the moment t1, and an operation performed on the transaction account is "adding 100 to the balance of the transaction account a" in the operation 102b after the transaction to which part of the transaction data in the block 3 submitted to the ledger belongs is executed after the moment t1, the consensus node can immediately perform snapshot processing on the account state of the transaction account at the moment t1 when a snapshot instruction for the transaction account is triggered, to obtain an account state 103a. It can be seen from the above that the account state 103a obtained through the snapshot at the moment t1 is an account state corresponding to the block 3. However, the account state 103a is an account state of the transaction account after the transaction data in the block 3 is partially submitted, instead of an account state of the transaction account after all the transaction data in the block 3 is submitted. Therefore, the account state 103a is incomplete.

In the present disclosure, each time the consensus node 100 submits a block to the ledger, a write-ahead logging (WAL) log of the submitted block may be first generated. The WAL log is a binary code obtained after the block is serialized, and may include account data corresponding to the block. One block corresponds to one WAL log. Through the WAL log of a block, an account state of a transaction account after a transaction to which all transaction data in the block belongs is executed can be recovered. Before submitting a block to the ledger, the consensus node 100 can pre-store a WAL log of the block. Therefore, at the moment t1, the consensus node 100 has pre-stored a WAL log of the block 1, a WAL log of the block 2, and a WAL log of the block 3. The WAL log of the block 1, the WAL log of the block 2, and the WAL log of the block 3 may also be stored in the ledger of the consensus node 100. Because the account state 103a is obtained by performing snapshot processing on the account state of the transaction account in real time at the moment t1, the account state 103a may be referred to as a snapshot account state. After the consensus node 100 performs snapshotting at the moment t1 to obtain the account state 103a, the pre-stored WAL log of the block 3 can be obtained from the ledger, and the consensus node 100 can use the WAL log of the block 3 to execute the transaction account again. Then, the account state of the transaction account after the transaction to which complete transaction data in the block 3 belongs is executed can be obtained. That is, the account state 103a becomes an account state 104a. The account state 104a is specifically that: the balance of the transaction account a is 140 (40 plus 100), the balance of the transaction account b is 80, and the balance of the transaction account c is 150. The account state 104a may be referred to as a corrected snapshot account state, and the account state 104a is the account state of the transaction account corresponding to the block 3 that needs to be finally obtained.

According to the method provided in the present disclosure, because the consensus node will pre-store a WAL log of each block before adding each block to the ledger, when the snapshot instruction is triggered at a certain moment, it is also possible to perform snapshot processing on the account state of the transaction account in real time to obtain the snapshot account state even if the block being submitted is not completely submitted to the ledger are submitted. After that, the snapshot account state can be corrected through the pre-stored WAL log of the block being submitted, to obtain a corrected final snapshot account state, which ensures real-time performance of the account state of the transaction account.

Figure 3:
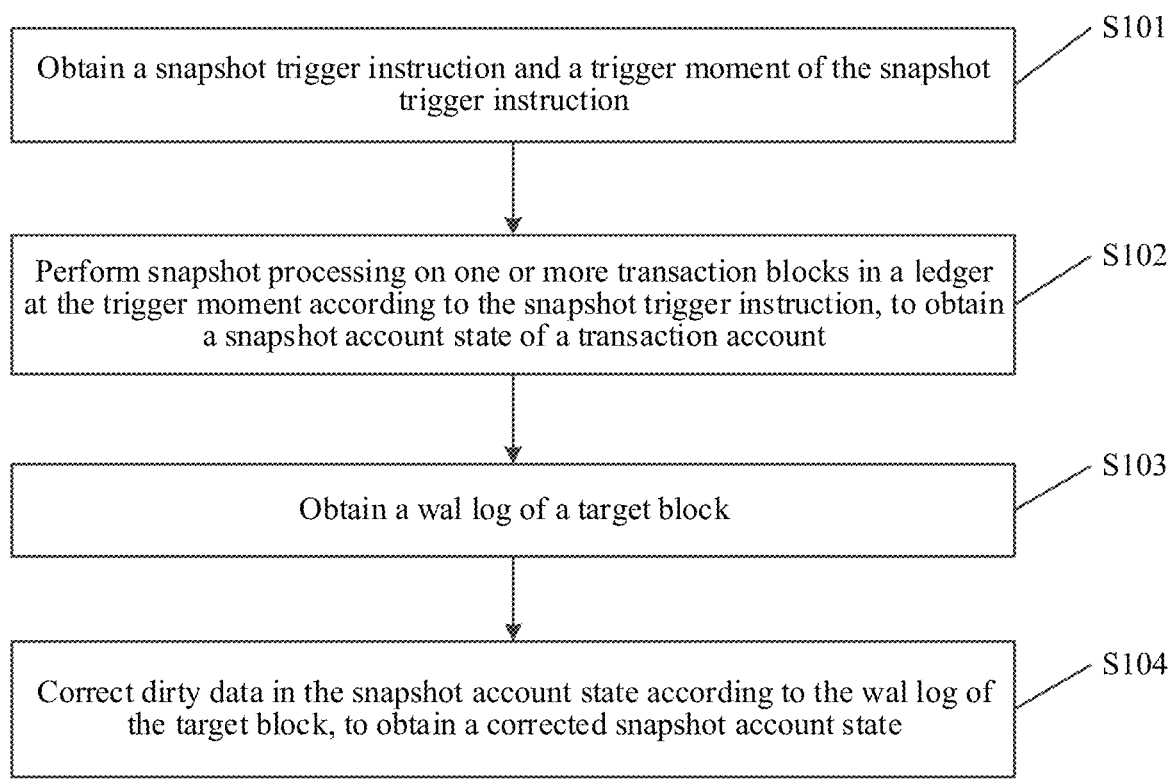
FIG. 3 is a schematic flowchart of a blockchain-based data snapshot method according to an embodiment of the present disclosure.

FIG. 3 is a schematic flowchart of a blockchain-based data snapshot method according to an embodiment of the present disclosure. As shown in FIG. 3, the method may include the following steps:

Step S101. Obtain a snapshot trigger instruction and a trigger moment of the snapshot trigger instruction.

An execution body in this embodiment may be any one of the consensus nodes in a blockchain network. The consensus node may obtain the snapshot trigger instruction, and the snapshot trigger instruction may be transmitted by a client to the consensus node. The client may request the consensus node to perform snapshot processing on the account state of the transaction account by transmitting the snapshot trigger instruction to the consensus node. The snapshot processing on the account state of the transaction account means backing up an account state of the transaction account at a certain moment. The account state of the transaction account may refer to a state of an account balance of the transaction account. For example, the account state of the transaction account may refer to that a balance of the transaction account a is 1, and a balance of the transaction account b is 2, and so on at a certain moment. The account state of the transaction account is account data of the transaction account after a transaction to which the transaction data in the block submitted to the ledger of the consensus node belongs is executed. For example, a piece of transaction data in a block in the ledger of the consensus node is that the transaction account a transfers 100 to the transaction account b. After a transaction corresponding to the transaction data is executed, a change in the account data of the transaction account is that the balance of the transaction account a is decreased by 100 and the balance of the transaction account b is increased by 100. The consensus node can obtain the trigger moment of the snapshot trigger instruction, and the trigger moment is a moment when the consensus node obtains the snapshot trigger instruction. Therefore, the consensus node is required to perform snapshot processing on the account state of the transaction account at the trigger moment.

Step S102. Perform snapshot processing on one or more transaction blocks in a ledger at the trigger moment according to the snapshot trigger instruction, to obtain a snapshot account state of a transaction account.

In this embodiment, the consensus node may perform snapshot processing on the one or more transaction blocks (a transaction block may include a plurality of pieces of transaction data) in the ledger at the trigger moment according to the snapshot trigger instruction, to obtain the snapshot account state of the transaction account. The ledger may be a blockchain ledger including one or more transaction blocks, and each transaction block may include transaction data associated with the transaction. The snapshot account state is account data related to the transaction data in the one or more transaction blocks, and the account data is generated after the transaction corresponding to the transaction block is executed on the transaction account. In other words, the account data is the account state of the transaction account after the transaction to which the transaction data in the one or more transaction blocks belongs is executed, and the account state may refer to a state of the account balance of the transaction account. For example, after the transaction to which the transaction data in the one or more transaction blocks belongs is executed, the account balance of the transaction account changes from 5 to 10, which can be understood as that the account state of the transaction account changes from an account balance 5 to an account balance 10.

The ledger of the consensus node may include two databases, which are a master database and a snapshot database. The master database is used for storing the transaction block, and the snapshot database is used for synchronously storing an account state of the transaction account in real time after a transaction to which the transaction data in the one or more transaction blocks belongs is executed on the transaction account. For example, an initial account balance of the transaction account a is 0. After a transaction to which transaction data 1 in the transaction block in the master database belongs is executed, the account balance of the transaction account a is increased by 10. After a transaction to which transaction data 2 belongs is executed, the account balance of the transaction account a is decreased by 5, and after a transaction to which transaction data 3 belongs is executed, the account balance of the transaction account a is increased by 6. Then the snapshot database can store a final balance of the transaction account a, which is 11 (that is, 0+10−5+6), after the transaction data 1, transaction data 2 and transaction data 3 are executed. For the account data (that is, the account balance of the transaction account), a change to the account balance of the transaction account caused by a subsequent transaction will overwrite a change to the account balance of the transaction account caused by a previously executed transaction. Therefore, the snapshot processing on the account data of the transaction account means backing up a latest account state of the transaction account.

After obtaining the snapshot trigger instruction, the consensus node can control the snapshot database to immediately suspend synchronizing the account state of the transaction account after a transaction, to which transaction data in a transaction block subsequently submitted to the master database belongs, is executed. In other words, after the snapshot trigger instruction is obtained, a change to the account balance of the transaction account after the transaction, to which the transaction data after the trigger moment belongs is executed, will not be synchronized to the snapshot database. At this time, the account state of the transaction account at the trigger moment is remained in the snapshot database. For example, at the trigger moment, a balance of the transaction account a is 10, a balance of the transaction account b is 30, and so on. Therefore, the consensus node can obtain the account state of the transaction account at the trigger moment from the snapshot database, and use a final account state of the transaction account at the trigger moment as the snapshot account state.

The snapshot processing performed on the account state of the transaction account will not affect further addition of new blocks to the master database by the consensus node. In other words, after obtaining the snapshot trigger instruction, the consensus node will only control the snapshot database to suspend synchronizing the account state of the transaction account after the trigger moment. However, during a snapshot processing period, transaction data after the trigger moment can be continuously added to the master database.

Step S103. Obtain a WAL log of a target block.

The target block is a block with a highest block height in the one or more transaction blocks, and the WAL log of the target block includes account data corresponding to the target block.

The consensus node can obtain the WAL log of the target block. The transaction blocks added to the ledger by the consensus node are all blocks that have passed the consensus. Therefore, the target block is also a block that has passed the consensus of the blockchain network. For example, the target block may be generated by the consensus node, and it can be understood that the target block may also be generated by other consensus nodes. The consensus node may submit the generated target block to the blockchain network, to achieve a consensus on the target block. Upon detecting that a consensus is performed on the target block (for example, a consensus by a plurality of consensus nodes in the blockchain network), and a consensus pass rate is greater than or equal to a pass rate threshold (which can be set manually), the consensus node may generate the WAL log of the target block. Then the consensus node stores the WAL log of the target block and adds the target block to the ledger (for example, to the master database). For example, when the blockchain network includes 5 consensus nodes, where the target block passes the verification by 3 consensus nodes, and the target block fails to pass the verification by 2 consensus nodes, the consensus pass rate for the target block is 3/5.

In the present disclosure, each time the consensus node adds a block to the master database, the consensus node can generate a WAL log of the added block, and the WAL log includes account data corresponding to the block, such as one or more pieces of transaction data corresponding to the block, the account data after the transaction corresponding to the block is executed on the transaction account, and so on. The consensus node will first store the WAL log of the block (the WAL log can also be stored in the ledger, for example, stored in the master database), and then add the block to the master database. In addition, each time a block is added to the master database, the account state of the transaction account after the transaction to which the transaction data in the block belongs is executed and the WAL log corresponding to the block will be synchronized to the snapshot database. Specifically, when the WAL log of a certain block is added to the master database, the WAL log of this block will also be synchronized to the snapshot database in real time. Therefore, it can be understood that, at a certain moment (such as the trigger moment), a complete WAL log of a certain block and the account state of transaction account after a transaction to which some transaction data in the block belongs is executed may be synchronized to the snapshot database (when the block is being added to the master database, but not fully added to the master database, that is, only part of the transaction data of the block is added to the master database). During addition of transaction blocks into a master database, a next transaction block is added only after addition of a previous transaction block is completed, and a block height of the next block is greater than a block height of the previous block. Therefore, only a block with a highest block height in the master database is incomplete (that is, not completely added to the master database). Correspondingly, the snapshot database includes an account state of the transaction account after a transaction to which transaction data in only one incomplete block belongs is executed.

The WAL log added to the master database may be associatively stored with the block height of the corresponding block, and a WAL log corresponding to a block can be subsequently retrieved through block height association of the block. For example, before adding the target block to the master database, the consensus node may obtain a block height of the target block if the target block is added to the master database. The consensus node may associatively store the block height of the target block and the WAL log of the target block in the ledger, for example, in the master database. After that, the consensus node can continue to add the target block to the master database according to a required block height of the target block. Therefore, the snapshot database also synchronously associatively stores the block height of each block in the master database and the corresponding WAL log (including the block height of the target block and the corresponding WAL log). A manner in which the consensus node associatively stores the block height of each block and the corresponding WAL log may be as follows: taking a process of associatively storing the block height of the target block and the corresponding WAL log as an example, the consensus node can generate associated information according to the block height of the target block and the WAL log of the target block. The associated information includes the block height of the target block and the WAL log of the target block. The consensus node may package the associated information to obtain an associated block, and the associated block includes the associated information. The consensus node may add the associated block to the ledger (to the master database and the snapshot database).

Subsequently, in a case of obtaining the WAL log of the target block, the consensus node may traverse, according to the block height of the target block, the ledger to retrieve the associated block comprising the block height of the target block, and obtain the associated information including the block height of the target block from the traversed associated block. Further, the consensus node can obtain the WAL log of the target block from the obtained associated information. That is, the consensus node may obtain the WAL log of the target block according to the block height of the target block.

The target block is a block with a highest block height in the ledger at the trigger moment. In principle, at the trigger moment, the highest block height of the block in the master database is the same as a highest block height corresponding to the WAL log in the snapshot database. When they are not the same, the target block refers to a block corresponding to the WAL log associated with the highest block height in the snapshot database. In other words, the highest block height associated with the WAL log in the snapshot database is the block height of the target block. It can be seen from the above that, at the trigger moment, the target block in the master database may be incomplete, and the account state in the snapshot database may not be the account state after the transaction account is executed using all transaction data in the target block.

It can be understood that the consensus node may generate the WAL log of each block by using various methods. Taking generation of the WAL log of the target block as an example, one method may be described as follows: The consensus node may generate a redo log of the target block. The redo log includes an account state of the transaction account after a transaction corresponding to the target block is performed on the transaction account. The transaction corresponding to the target block is the transaction to which the transaction data recorded in the target block belongs. The consensus node can generate the WAL log of the target block according to the redo log, and the WAL log of the target block includes the redo log. Another method may be that, the consensus node generates an undo log of the target block, the undo log including an account state of the transaction account before a transaction corresponding to the target block is performed on the transaction account. The consensus node can generate the WAL log of the target block according to the undo log, and the WAL log of the target block includes the undo log. In some embodiments, the WAL log of the target block may also include both the redo log and the undo log.

Figure 4:
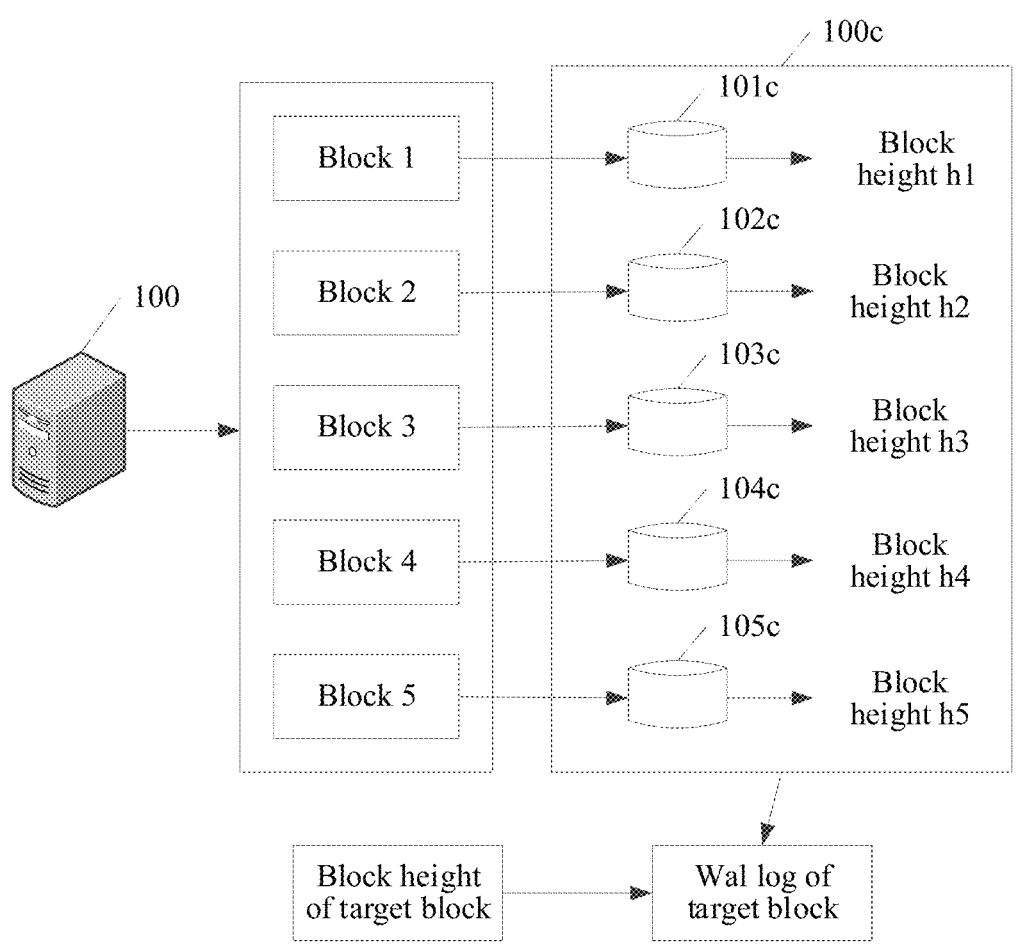
FIG. 4 is a schematic diagram of a scenario of obtaining a WAL log according to an embodiment of the present disclosure.

FIG. 4 is a schematic diagram of a scenario of obtaining a WAL log according to an embodiment of the present disclosure. As shown in FIG. 4, the transaction blocks added to the ledger of the consensus node 100 include a block 1, a block 2, a block 3, a block 4, and a block 5. The consensus node 100 associatively stores a WAL log 101c of the block 1 and a block height h1 of the block 1, a WAL log 102c of the block 2 and a block height h2 of the block 2, a WAL log 103c of the block 3 and a block height h3 of the block 3, a WAL log 104c of the block 4 and a block height h4 of the block 4, and a WAL log 105c of the block 5 and a block height h5 of the block 5. Subsequently, the consensus node can obtain the WAL log of the target block from the associatively stored WAL log and the corresponding block height according to the block height of the target block.

Step S104. Correct dirty data in the snapshot account state according to the WAL log of the target block, to obtain a corrected snapshot account state.

Because the target block may not be completely added to the ledger at the trigger moment, it is highly possible that there is dirty data in the snapshot account state obtained at the trigger moment. The dirty data is generated because there is only part of the transaction data (incomplete transaction data) in the target block in the ledger. The dirty data indicates that the snapshot account state is not a complete snapshot account state corresponding to the target block. That is, the snapshot account state only includes the account state of the transaction account after the transaction to which some transaction data in the target block belongs is executed. Therefore, the consensus node can correct the dirty data in the snapshot account state by obtaining the WAL log of the target block. In other words, through the WAL log of the target block, the consensus node can correct the snapshot account state to be the account state of the transaction account after a transaction to which all transaction data in the target block belongs is executed, and finally a corrected snapshot account state is obtained. The corrected snapshot account state is the account state of the transaction account corresponding to the block height of the target block that needs to be backed up.

In some cases, when the WAL log of the target block includes the redo log of the target block, the consensus node may correct the dirty data in the snapshot account state through the redo log of the target block, to obtain the corrected snapshot account state. At this time, the corrected snapshot account state is the account state of the transaction account after the transaction to which all transaction data in the target block belongs is executed. In other words, the corrected snapshot account state obtained at this time is the account state of the transaction account corresponding to the block height of the target block. When the WAL log of the target block includes the undo log of the target block, the consensus node may correct the dirty data in the snapshot account state through the undo log of the target block, to obtain the corrected snapshot account state. At this time, the corrected snapshot account state is the account state of the transaction account before the transaction to which all transaction data in the target block belongs is executed. In other words, the corrected snapshot account state obtained at this time is the account state of the transaction account corresponding to the block height of a block before the target block.

After the corrected snapshot account state has been successfully obtained (in fact, after the snapshot account state is obtained), the consensus node may control the account state of the transaction account in the master database after a transaction, to which transaction data added after the trigger moment belongs, is executed to be continuously synchronized to the snapshot database, and control the WAL log of the block added after the trigger moment in the master database to be continuously synchronized to the snapshot database.

Figure 5:
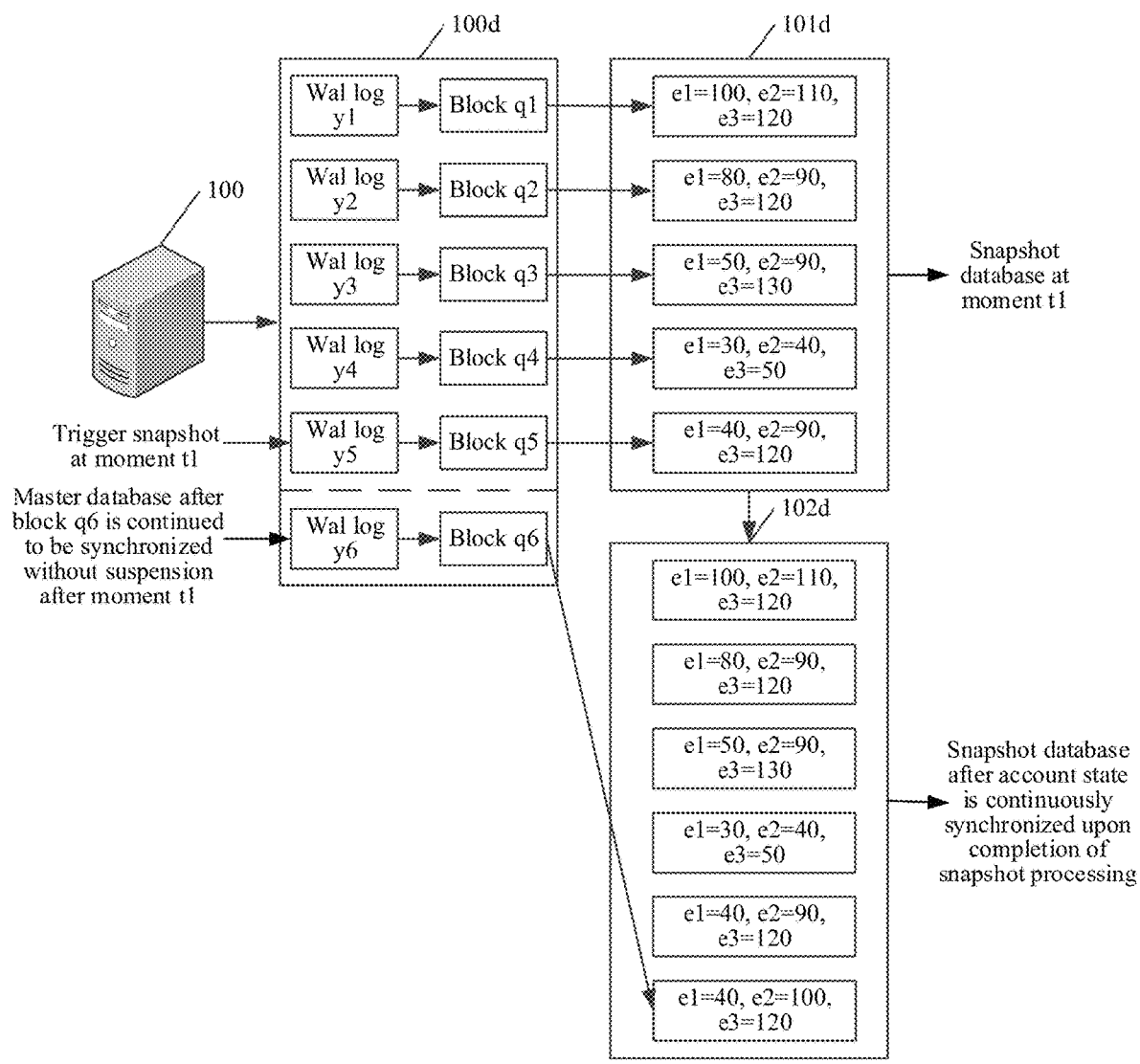
FIG. 5 is a schematic diagram of a data synchronization scenario according to an embodiment of the present disclosure.

FIG. 5 is a schematic diagram of a data synchronization scenario according to an embodiment of the present disclosure. As shown in FIG. 5, the ledger of the consensus node 100 includes a master database 100d and a snapshot database 101d. The master database 100d includes a block q1 and a WAL log y1 corresponding to the block q1, a block q2 and a WAL log y2 corresponding to the block q2, a block q3 and a WAL log y3 corresponding to the block q3, a block q4 and a WAL log y4 corresponding to the block q4, and a block q5 and a WAL log y5 corresponding to the block q5. After the block q1 is submitted to the master database 100d, an account state of the transaction account synchronized to the snapshot database 101d is that "a balance of an account e1 is 100, a balance of an account e2 is 110, and a balance of an account e3 is 120" (that is, "e1=100, e2=110, e3=120"). Then, after the block q2 is submitted to the master database 100d, the account state of the transaction account synchronized to the snapshot database 101d is that "a balance of the account e1 is 80, a balance of the account e2 is 90, and a balance of the account e3 is 120" (that is, "e1=80, e2=90, e3=120"). Then, after the block q3 is submitted to the master database 100d, the account state of the transaction account synchronized to the snapshot database 101d is that "a balance of the account e1 is 50, a balance of the account e2 is 90, and a balance of the account e3 is 130" (that is, "e1=50, e2=90, e3=130"). Then, after the block q4 is submitted to the master database 100d, the account state of the transaction account synchronized to the snapshot database 101d is that "a balance of the account e1 is 30, a balance of the account e2 is 40, and a balance of the account e3 is 50" (that is, "e1=30, e2=40, e3=50"). Then, after the block q5 is submitted to the master database 100d, the account state of the transaction account synchronized to the snapshot database 101d is that "a balance of the account e1 is 40, a balance of the account e2 is 90, and a balance of the account e3 is 120" (that is, "e1=40, e2=90, e3=120").

At this time, when the consensus node completely adds the block q5 to the master database 100d, the time is exactly t1, and the consensus node 100 obtains the snapshot trigger instruction at the moment t1. That is, the trigger moment is the moment t1. Then, at the moment t1, the consensus node 100 can control the snapshot database 101d to stop synchronizing the account state of the transaction account after the moment t1 to the master database 100d. At this time, a backed-up account state finally obtained by the consensus node is "e1=40, e2=90, e3=120". In addition, during a period when the consensus node backs up the account state "e1=40, e2=90, e3=120" at the moment t1, a new block q6 and a WAL log of the block q6 are added to the master database 100d. If the account state of the transaction account after the transaction to which the transaction data in the block q6 added to the master database 100d belongs is executed is "e1=40, e2=100, e3=120", after snapshot processing is completed, the consensus node 100 may control the snapshot database 101d to continue to synchronize an account state after a transaction to which the transaction data added to the master database 100d after the trigger moment t1 belongs is executed, and update the snapshot database 101d to the snapshot database 102d.

When transaction data in an account of the consensus node is tampered with or lost, the account state of the transaction account will also be maliciously tampered with or lost. At this time, the consensus node may use the backed-up corrected snapshot account state to perform state recovery on the account state of the transaction account, to obtain a recovered account state. The recovered account state is the same as the corrected snapshot account state.

Figure 6:
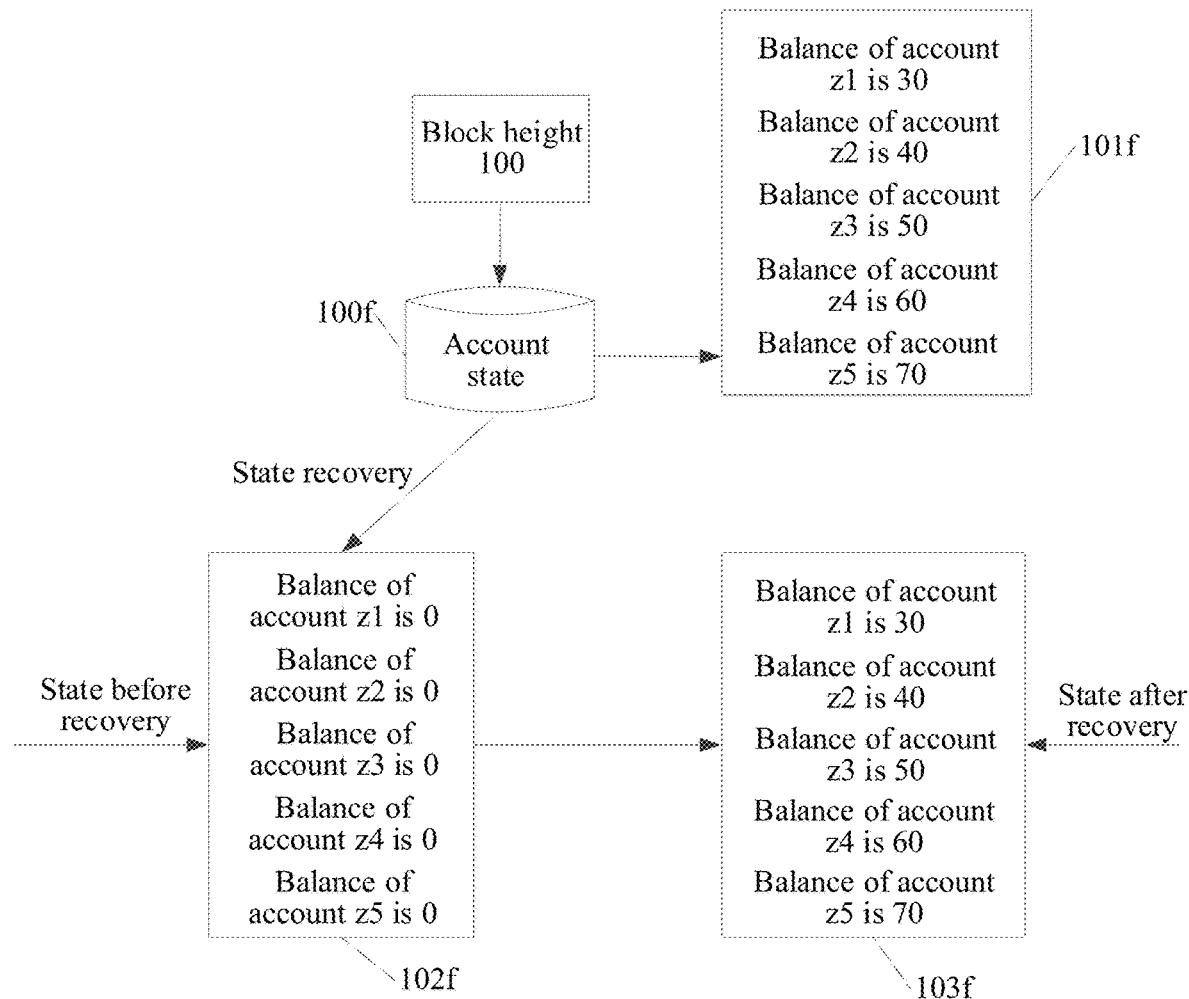
FIG. 6 is a schematic diagram of a scenario of recovering an account state according to an embodiment of the present disclosure.

FIG. 6 is a schematic diagram of a scenario of recovering an account state according to an embodiment of the present disclosure. As shown in FIG. 6, when the account state (which may be the corrected snapshot account state) of the transaction account backed up by the consensus node is an account state 100f corresponding to a block height 100 (specifically, an account state 101f: a balance of an account z1 is 30, a balance of an account z2 is 40, a balance of an account z3 is 50, a balance of an account z4 is 60, and a balance of an account z5 is 70), and a tampered account state of a transaction account is an account state 102f (specifically: a balance of the account z1 is 0, a balance of the account z2 is 0, a balance of the account z3 is 0, a balance of the account z4 is 0, and a balance of the account z5 is 0), a recovered account state 103f can be obtained after the tampered 102f is recovered through the backed-up account state 101f. As shown in FIG. 6, the account state 103f is the same as the account state 101f. That is, the account state 102f before recovery may be recovered to the account state 103f the same as the account state 101f through the backed-up account state 101f.

According to the method provided in the present disclosure, by pre-storing the WAL log of the block that needs to be submitted to the ledger, it is possible to perform snapshot processing on the account state of the transaction account in real time at the trigger moment, and during snapshot processing, addition of new blocks to the ledger (that is, the master database) by the consensus node is not affected.

In the present disclosure, during data snapshot, a snapshot trigger instruction and a trigger moment of the snapshot trigger instruction can be obtained. According to the snapshot trigger instruction, snapshot processing is performed on one or more transaction blocks in a ledger at the trigger moment, to obtain a snapshot account state of a transaction account, the snapshot account state being account data related to transaction data in the one or more transaction blocks. During addition of transaction blocks into a master database, a next transaction block is added only after addition of a previous transaction block is completed, and a block height of the next block is greater than a block height of the previous block. Therefore, only a block with a highest block height in the master database is incomplete. Therefore, to avoid that a target block with a highest block height in the one or more transaction blocks is not fully submitted to the ledger at the snapshot trigger moment, the WAL log of the target block can be obtained. The WAL log of the target block is a log including account data corresponding to the target block, so that dirty data in the snapshot account state can be corrected according to the WAL log of the target block, to obtain a corrected snapshot account state, the dirty data being generated based on incomplete transaction data in the target block included in the ledger. It can be seen that, according to the method provided in the present disclosure, the dirty data generated by the incomplete target block in the snapshot can be corrected through the WAL log of the target block. Therefore, even if the target block is not fully added to the ledger at the trigger moment, snapshot processing can also be immediately performed on the account state of the transaction account, which improves the efficiency of obtaining the snapshot account state of the transaction account.

Figure 7:
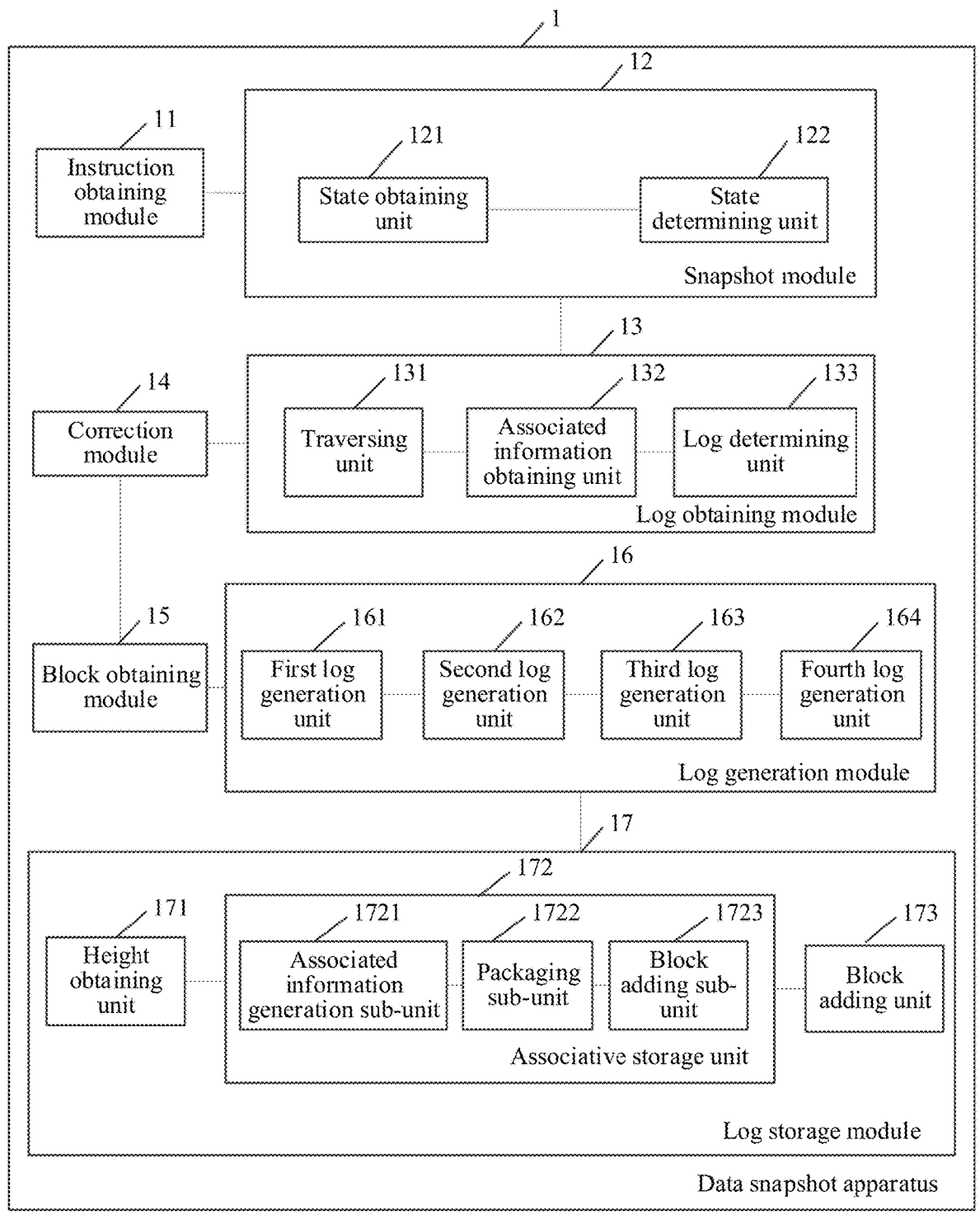
FIG. 7 is a schematic structural diagram of a blockchain-based data snapshot apparatus according to an embodiment of the present disclosure.

FIG. 7 is a schematic structural diagram of a blockchain-based data snapshot apparatus according to an embodiment of the present disclosure. As shown in FIG. 7, the data snapshot apparatus 1 may perform the foregoing data snapshot method described in FIG. 3, and the data snapshot apparatus 1 may include: an instruction obtaining module 11, a snapshot module 12, a log obtaining module 13, and a correction module 14.

The instruction obtaining module 11 is configured to obtain a snapshot trigger instruction and a trigger moment of the snapshot trigger instruction.

The snapshot module 12 is configured to perform snapshot processing on one or more transaction blocks in a ledger at the trigger moment according to the snapshot trigger instruction, to obtain a snapshot account state of a transaction account, the snapshot account state being account data related to transaction data in the one or more transaction blocks.

The log obtaining module 13 is configured to obtain a WAL log of a target block, the target block being a block with a highest block height in the one or more transaction blocks, the WAL log of the target block including account data corresponding to the target block.

The correction module 14 is configured to correct dirty data in the snapshot account state according to the WAL log of the target block, to obtain a corrected snapshot account state, the dirty data being generated based on incomplete transaction data in the target block included in the ledger.

In one embodiment, for a specific functional implementation of the instruction obtaining module 11, the snapshot module 12, the log obtaining module 13 and the correction module 14, reference may be made to steps S101 to S104 in the embodiment corresponding to FIG. 3, and details are not described herein again.

In one embodiment, the data snapshot apparatus 1 further includes: a block obtaining module 15, a log generation module 16 and a log storage module 17.

The block obtaining module 15 is configured to generate the target block and make a consensus on the target block.

The log generation module 16 is configured to generate the WAL log of the target block upon detecting that a consensus pass rate of the target block is greater than or equal to a pass rate threshold.

The log storage module 17 is configured to store the WAL log of the target block, and add the target block to the ledger.

For an example functional implementation of the block obtaining module 15, the log generation module 16, and the log storage module 17, reference may be made to step S103 in the embodiment corresponding to FIG. 3, and details are not described herein again.

In one embodiment, the log generation module 16 includes: a first log generation unit 161, and a second log generation unit 162.

The first log generation unit 161 is configured to generate a redo log of the target block, the redo log including an account state of the transaction account after a transaction corresponding to the target block is executed on the transaction account.

The second log generation unit 162 is configured to generate the WAL log of the target block according to the redo log.

For an example function implementation of the first log generation unit 161 and the second log generation unit 162, reference may be made to step S103 in the embodiment corresponding to FIG. 3, and details are not described herein again.

In one embodiment, the log generation module 16 includes: a third log generation unit 163, and a fourth log generation unit 164.

The third log generation unit 163 is configured to generate an undo log of the target block, the undo log including an account state of the transaction account before a transaction corresponding to the target block is executed on the transaction account.

The fourth log generation unit 164 is configured to generate the WAL log of the target block according to the undo log.

For an example function implementation of the third log generation unit 163 and the fourth log generation unit 164, reference may be made to step S103 in the embodiment corresponding to FIG. 3, and details are not described herein again.

In one embodiment, the correction module 14 is further configured to:

correct the dirty data in the snapshot account state according to the redo log in the WAL log of the target block, to obtain a corrected snapshot account state, the corrected snapshot account state including the account state of the transaction account after the transaction corresponding to the target block is executed on the transaction account.

In one embodiment, the correction module 14 is further configured to:

correct the dirty data in the snapshot account state according to the undo log in the WAL log of the target block, to obtain a corrected snapshot account state, the corrected snapshot account state including the account state of the transaction account before the transaction corresponding to the target block is executed on the transaction account.

In one embodiment, the log storage module 17 includes: a height obtaining unit 171, an associative storage unit 172, and a block adding unit 173.

The height obtaining unit 171 is configured to obtain a block height of the target block.

The associative storage unit 172 is configured to associatively store the block height of the target block and the WAL log of the target block to the ledger, the block height of the target block being used for associatively retrieving the WAL log of the target block.

The block adding unit 173 is configured to add the target block to the ledger according to the block height of the target block.

For an example functional implementation of the height obtaining unit 171, the associative storage unit 172 and the block adding unit 173, reference may be made to step S103 in the embodiment corresponding to FIG. 3, and details are not described herein again.

In one embodiment, the associative storage unit 172 includes: an associated information generation sub-unit 1721, a packaging sub-unit 1722, and a block adding sub-unit 1723.

The associated information generation sub-unit 1721 is configured to generate associated information according to the block height of the target block and the WAL log of the target block.

The packaging sub-unit 1722 is configured to package the associated information, to obtain an associated block.

The block adding sub-unit 1723 is configured to add the associated block to the ledger.

For an example functional implementation of the associated information generation sub-unit 1721, the packaging sub-unit 1722 and the block adding sub-unit 1723, reference may be made to step S103 in the embodiment corresponding to FIG. 3, and details are not described herein again.

In one embodiment, the log obtaining module 13 includes: a traversing unit 131, an associated information obtaining unit 132, and a log determining unit 133.

The traversing unit 131 is configured to traverse, according to the block height of the target block, the ledger to retrieve the associated block comprising the block height of the target block.

The associated information obtaining unit 132 is configured to obtain the associated information including the block height of the target block from the associated block.

The log determining unit 133 is configured to determine a WAL log in the associated information as the WAL log of the target block.

For an example functional implementation of the traversing unit 131, the associated information obtaining unit 132 and the log determining unit 133, reference may be made to step S103 in the embodiment corresponding to FIG. 3, and details are not described herein again.

In one embodiment, the data snapshot apparatus 1 is further configured to:

when an account state of the transaction account is illegally tampered with, perform state recovery on the account state of the transaction account according to a stored corrected snapshot account state, to obtain a recovered account state, the recovered account state being the same as the corrected snapshot account state.

In one embodiment, the ledger includes a master database and a snapshot database, the master database being used for storing the transaction block, the snapshot database synchronously storing an account state of the transaction account after a transaction to which transaction data in the one or more transaction blocks belongs is executed on the transaction account;

the snapshot module 12 is specifically configured to:

control, according to the snapshot trigger instruction, the snapshot database to suspend synchronizing an account state of the transaction account after a transaction to which transaction data after the trigger moment belongs is executed on the transaction account, and perform snapshot processing on the one or more transaction blocks in the ledger at the trigger moment, to obtain the snapshot account state of the transaction account, the master database being used for continuously adding the transaction data after the trigger moment during a snapshot processing period; and the data snapshot apparatus 1 is specifically configured to:

control, after the corrected snapshot account state is stored, the snapshot database to continue to synchronize the account state of the transaction account after a transaction to which transaction data after the trigger moment in the master database belongs is executed on the transaction account.

In one embodiment, the snapshot module 12 includes: a state obtaining unit 1211 and a state determining unit 122.

The state obtaining unit 121 is configured to obtain a final state of the transaction account at the trigger moment from the snapshot database.

The state determining unit 122 is configured to determine the final state of the transaction account as the snapshot account state of the transaction account.

For an example functional implementation of the state obtaining unit 121 and the state determining unit 122, reference may be made to step S102 in the embodiment corresponding to FIG. 3, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In the present disclosure, during data snapshot, a snapshot trigger instruction and a trigger moment of the snapshot trigger instruction can be obtained. According to the snapshot trigger instruction, snapshot processing is performed on one or more transaction blocks in a ledger at the trigger moment, to obtain a snapshot account state of a transaction account, the snapshot account state being account data related to transaction data in the one or more transaction blocks. During addition of transaction blocks into a master database, a next transaction block is added only after addition of a previous transaction block is completed, and a block height of the next block is greater than a block height of the previous block. Therefore, only a block with a highest block height in the master database is incomplete. Therefore, to avoid that a target block with a highest block height in the one or more transaction blocks is not fully submitted to the ledger at the snapshot trigger moment, the WAL log of the target block can be obtained. The WAL log of the target block is a log including account data corresponding to the target block, so that dirty data in the snapshot account state can be corrected according to the WAL log of the target block, to obtain a corrected snapshot account state, the dirty data being generated based on incomplete transaction data in the target block included in the ledger. It can be seen that, according to the method provided in the present disclosure, the dirty data generated by the incomplete target block in the snapshot can be corrected through the WAL log of the target block. Therefore, even if the target block is not fully added to the ledger at the trigger moment, snapshot processing can also be immediately performed on the account state of the transaction account, which improves the efficiency of obtaining the snapshot account state of the transaction account.

Figure 8:
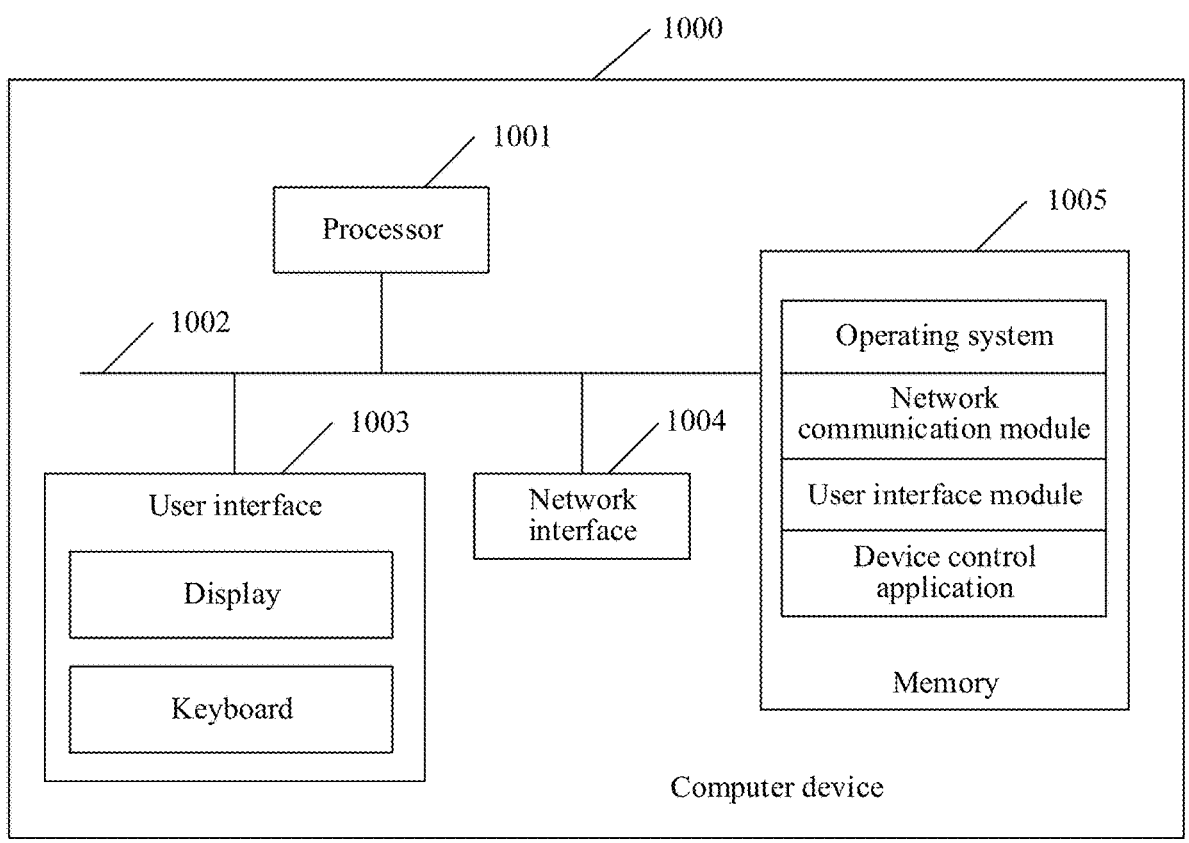
FIG. 8 is a schematic structural diagram of a computer device according to an embodiment of the present disclosure.

FIG. 8 is a schematic structural diagram of a computer device according to an embodiment of the present disclosure. As shown in FIG. 8, the computer device 1000 may include: a processor 1001, a network interface 1004, and a memory 1005, as well as a user interface 1003 and at least one communication bus 1002. The communications bus 1002 is configured to implement connection and communication between these components. The user interface 1003 may include a display, a keyboard, and in some embodiments, the user interface 1003 may further include a standard wired interface and a standard wireless interface. In some embodiments, the network interface 1004 may include a standard wired interface and a standard wireless interface (such as a Wi-Fi interface). The memory 1005 may be a high-speed RAM, or may be a non-volatile memory, for example, at least one magnetic disk memory. In some embodiments, the memory 1005 may be further at least one storage apparatus away from the processor 1001. As shown in FIG. 8, the memory 1005 used as a computer storage medium may include an operating system, a network communication module, a user interface module, and a device control application.

In the computer device 1000 shown in FIG. 8, the network interface 1004 may provide a network communication function, the user interface 1003 is mainly configured to provide an input interface for a user, and the processor 1001 may be configured to invoke the device control application stored in the memory 1005, to implement the description of the blockchain-based data snapshot method in the foregoing embodiment corresponding to FIG. 3. It is to be understood that the computer device 1000 described in the present disclosure may also implement the descriptions of the blockchain-based data snapshot apparatus 1 in the foregoing embodiment corresponding to FIG. 7, and details are not described herein again. In addition, the description of beneficial effects of the same method is not described herein again.

In addition, the present disclosure further provides a computer-readable storage medium. The computer-readable storage medium stores a computer program executed by the blockchain-based data snapshot apparatus 1 mentioned above, and the computer program includes program instructions. When executing the program instructions, the processor can perform the descriptions of the blockchain-based data snapshot method in the foregoing embodiment corresponding to FIG. 3. Therefore, details are not described herein again. In addition, the description of beneficial effects of the same method is not described herein again. For technical details that are not disclosed in the computer storage medium embodiments of the present disclosure, refer to the descriptions of the method embodiments of the present disclosure.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure

What is claimed is:

1. A blockchain-based data snapshot method, performed by a consensus node in a blockchain network, comprising:
    obtaining a snapshot trigger instruction and a trigger moment of the snapshot trigger instruction;
    performing snapshot processing on one or more transaction blocks in a ledger at the trigger moment according to the snapshot trigger instruction, to obtain a snapshot account state of a transaction account, the snapshot account state being account data related to transaction data in the one or more transaction blocks;
    obtaining a write-ahead logging (WAL) log of a target block, the target block being a block with a highest block height in the one or more transaction blocks, the WAL log of the target block comprising account data corresponding to the target block; and
    correcting dirty data in the snapshot account state according to the WAL log of the target block, to obtain a corrected snapshot account state, the dirty data being generated based on incomplete transaction data in the target block comprised in the ledger.

2. The method according to claim 1, further comprising:
    generating the target block, and performing a consensus on the target block;
    generating the WAL log of the target block upon detecting that a consensus pass rate of the target block is greater than or equal to a pass rate threshold; and
    storing the WAL log of the target block, and adding the target block to the ledger.

3. The method according to claim 2, wherein the generating the WAL log of the target block comprises:
    generating a redo log of the target block, the redo log comprising an account state of the transaction account after a transaction corresponding to the target block is executed on the transaction account; and
    generating the WAL log of the target block according to the redo log.

4. The method according to claim 2, wherein the generating the WAL log of the target block comprises:
    generating an undo log of the target block, the undo log comprising an account state of the transaction account before a transaction corresponding to the target block is executed on the transaction account; and
    generating the WAL log of the target block according to the undo log.

5. The method according to claim 3, wherein the correcting dirty data in the snapshot account state according to the WAL log of the target block, to obtain a corrected snapshot account state comprises:
    correcting the dirty data in the snapshot account state according to the redo log in the WAL log of the target block, to obtain the corrected snapshot account state, the corrected snapshot account state comprising the account state of the transaction account after the transaction corresponding to the target block is executed on the transaction account.

6. The method according to claim 4, wherein the correcting dirty data in the snapshot account state according to the WAL log of the target block, to obtain a corrected snapshot account state comprises:
correcting the dirty data in the snapshot account state according to the undo log in the WAL log of the target block, to obtain the corrected snapshot account state, the corrected snapshot account state comprising the account state of the transaction account before the transaction corresponding to the target block is executed on the transaction account.

7. The method according to claim 2, wherein the storing the WAL log of the target block, and adding the target block to the ledger comprise:
obtaining a block height of the target block;
associatively storing the block height of the target block and the WAL log of the target block to the ledger, the block height of the target block being used for associatively retrieving the WAL log of the target block; and
adding the target block to the ledger according to the block height of the target block.

8. The method according to claim 7, wherein the associatively storing the block height of the target block and the WAL log of the target block to the ledger comprises:
generating associated information according to the block height of the target block and the WAL log of the target block;
packaging the associated information, to obtain an associated block; and
adding the associated block to the ledger.

9. The method according to claim 8, wherein the obtaining the WAL log of the target block comprises:
traversing, according to the block height of the target block, the ledger to retrieve the associated block comprising the block height of the target block;
obtaining the associated information comprising the block height of the target block from the associated block; and
determining a WAL log in the associated information as the WAL log of the target block.

10. The method according to claim 1, further comprising:
performing state recovery on the account state of the transaction account according to the stored corrected snapshot account state when the account state of the transaction account is tampered with, to obtain a recovered account state, the recovered account state being the same as the corrected snapshot account state.

11. The method according to claim 1, wherein the ledger comprises a master database configured to store the one or more transaction blocks and a snapshot database configured to synchronously store an account state of the transaction account after a transaction to which transaction data in the one or more transaction blocks belongs is executed on the transaction account;
the performing snapshot processing on one or more transaction blocks in a ledger at the trigger moment according to the snapshot trigger instruction, to obtain a snapshot account state of a transaction account comprises:
controlling, according to the snapshot trigger instruction, the snapshot database to suspend synchronizing an account state of the transaction account after a transaction to which transaction data after the trigger moment belongs is executed on the transaction account; and
performing the snapshot processing on the one or more transaction blocks in the ledger at the trigger moment, to obtain the snapshot account state of the transaction account, and continuously adding the transaction data to the master database after the trigger moment during a snapshot processing period; and
the method further comprises:
controlling, after the corrected snapshot account state is stored, the snapshot database to continue to synchronize the account state of the transaction account after a transaction to which transaction data after the trigger moment in the master database belongs is executed on the transaction account.

12. The method according to claim 11, wherein the performing snapshot processing on the one or more transaction blocks in the ledger at the trigger moment, to obtain the snapshot account state of the transaction account comprises:
obtaining a final state of the transaction account at the trigger moment from the snapshot database; and
determining the final state of the transaction account as the snapshot account state of the transaction account.

13. A blockchain-based data snapshot apparatus, deployed on a consensus node in a blockchain network, comprising a memory and a processor, the memory storing a computer program, the computer program, when executed by the processor, causing the processor to perform operations including:
obtaining a snapshot trigger instruction and a trigger moment of the snapshot trigger instruction;
performing snapshot processing on one or more transaction blocks in a ledger at the trigger moment according to the snapshot trigger instruction, to obtain a snapshot account state of a transaction account, the snapshot account state being account data related to transaction data in the one or more transaction blocks;
obtaining a write-ahead logging (WAL) log of a target block, the target block being a block with a highest block height in the one or more transaction blocks, the WAL log of the target block comprising account data corresponding to the target block; and
correcting dirty data in the snapshot account state according to the WAL log of the target block, to obtain a corrected snapshot account state, the dirty data being generated based on incomplete transaction data in the target block comprised in the ledger.

14. The apparatus according to claim 13, wherein the processor is further configured to perform:
generating the target block, and performing a consensus on the target block;
generating the WAL log of the target block upon detecting that a consensus pass rate of the target block is greater than or equal to a pass rate threshold; and
storing the WAL log of the target block, and adding the target block to the ledger.

15. The apparatus according to claim 14, wherein the generating the WAL log of the target block comprises:
generating a redo log of the target block, the redo log comprising an account state of the transaction account after a transaction corresponding to the target block is executed on the transaction account; and
generating the WAL log of the target block according to the redo log.

16. The apparatus according to claim 15, wherein the correcting dirty data in the snapshot account state according to the WAL log of the target block, to obtain a corrected snapshot account state comprises:
correcting the dirty data in the snapshot account state according to the redo log in the WAL log of the target block, to obtain the corrected snapshot account state, the corrected snapshot account state comprising the account state of the transaction account after the transaction corresponding to the target block is executed on the transaction account.

17. The apparatus according to claim 14, wherein the generating the WAL log of the target block comprises:

generating an undo log of the target block, the undo log comprising an account state of the transaction account before a transaction corresponding to the target block is executed on the transaction account; and generating the WAL log of the target block according to the undo log.

18. The apparatus according to claim 17, wherein the correcting dirty data in the snapshot account state according to the WAL log of the target block, to obtain a corrected snapshot account state comprises:

correcting the dirty data in the snapshot account state according to the undo log in the WAL log of the target block, to obtain the corrected snapshot account state, the corrected snapshot account state comprising the account state of the transaction account before the transaction corresponding to the target block is executed on the transaction account.

19. The apparatus according to claim 14, wherein the storing the WAL log of the target block, and adding the target block to the ledger comprise:

obtaining a block height of the target block;

associatively storing the block height of the target block and the WAL log of the target block to the ledger, the block height of the target block being used for associatively retrieving the WAL log of the target block; and adding the target block to the ledger according to the block height of the target block.

20. A non-transitory computer-readable storage medium, storing a computer program, the computer program comprising program instructions, the program instructions, when executed by a processor, causing the processor to perform:

obtaining a snapshot trigger instruction and a trigger moment of the snapshot trigger instruction;

performing snapshot processing on one or more transaction blocks in a ledger at the trigger moment according to the snapshot trigger instruction, to obtain a snapshot account state of a transaction account, the snapshot account state being account data related to transaction data in the one or more transaction blocks;

obtaining a write-ahead logging (WAL) log of a target block, the target block being a block with a highest block height in the one or more transaction blocks, the WAL log of the target block comprising account data corresponding to the target block; and correcting dirty data in the snapshot account state according to the WAL log of the target block, to obtain a corrected snapshot account state, the dirty data being generated based on incomplete transaction data in the target block comprised in the ledger.

* * * * *